S. SLIWINSKI.
COMBINED FISHING ROD AND CANE.
APPLICATION FILED APR. 5, 1919.
1,310,452.
Patented July 22, 1919.
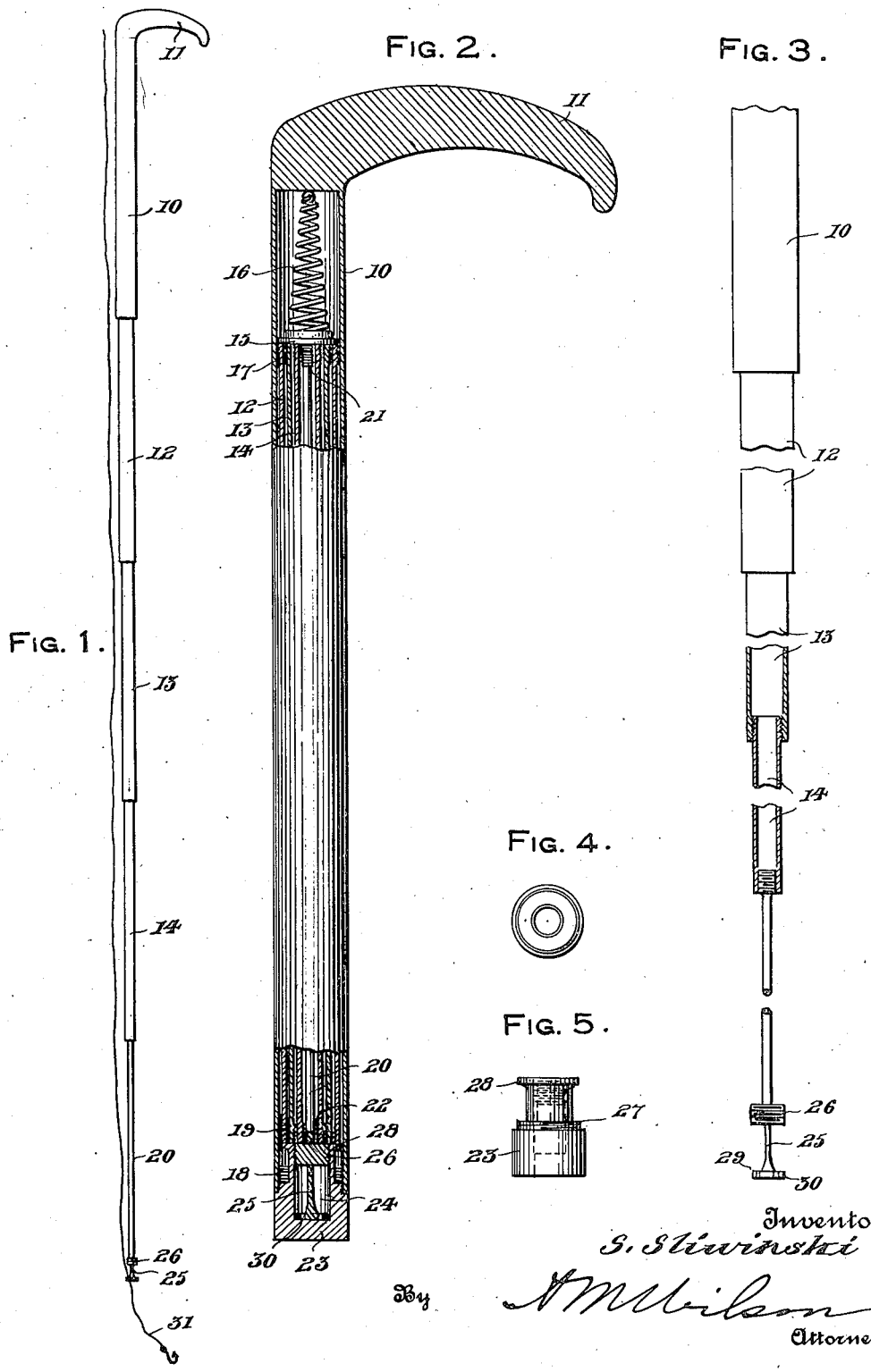

UNITED STATES PATENT OFFICE.

STEPHEN SLIWINSKI, OF CRESSONA, PENNSYLVANIA.

COMBINED FISHING-ROD AND CANE.

1,310,452. Specification of Letters Patent. Patented July 22, 1919.

Application filed April 5, 1919. Serial No. 287,747.

*To all whom it may concern:*

Be it known that I, STEPHEN SLIWINSKI, a citizen of Ukraine, residing at Cressona, in the county of Schuylkill and State of Pennsylvania, have invented certain new and useful Improvements in Combined Fishing-Rods and Canes, of which the following is a specification.

The primary object of the invention is the provision of a combined fishing rod and cane adapted for employment for walking purposes when compactly folded although readily extensible for use as a fishing rod whenever desired.

A further object of the invention is the provision of a fishing rod adapted for carrying a fish line in the usual manner and being readily folded telescopingly so as to be used as a walking cane when retained in its closed position, the structure possessing great strength and durability and being easy and inexpensive to manufacture.

With these general objects in view, the invention consists of the combination and arrangement of parts hereinafter fully described and illustrated in the accompanying drawing.

In the drawing, like reference characters designate corresponding parts throughout the several views, and Figure 1 is an elevational view of the invention employed as a fishing rod and showing a portion of the fish line, Fig. 2 is an enlarged view of the invention folded for use as a cane with portions broken away, Fig. 3 is an enlarged view partly in section and partly in elevation of the invention in its pole formation, Fig. 4 is an end elevation of the retainer cap employed, and Fig. 5 is a side view thereof.

My invention provides a tubular shaft 10 having an angularly projecting handle 11 at the closed end thereof while three tubular sections 12, 13, and 14 are telescopingly arranged with each other within the shaft 10. The sections 12, 13, and 14 are of equal length but of greatly decreasing diameter permitting them to readily fit within the shaft 10 with their inner ends seated upon a disk 15, the latter being normally projected by a spring 16.

Each of said sections have external threads 17 upon their inner ends, said threads of the section 12 being adapted to engage internal threads 18 at the outer end of the shaft 10, while the threads 17 of the sections 13 and 14 engage internal threads 19 at the outer ends of the sections 12 and 13 respectively.

A rod 20 is adapted to telescope within the section 14 and has a threaded inner end 21 for seating upon the disk 15 when the pole is folded and engagement with internal threads 22 at the outer end of the section 14 when the device is unfolded in its pole arrangement.

A cap 23 has a central bore 24 for receiving the tip 25 at the outer end of the rod 20, a portion of the bore 24 being threaded for engaging a threaded head 26 at the inner end or base of the tip 25. A threaded shoulder 27 of the cap 23 engages the threads 18 at the outer end of the shaft 10 and the cap 23 being mounted upon the outer end of the rod 20 in the manner described, the sections 12, 13 and 14 seat with their inner ends upon the disk 15 while the outer end of the section 14 is seated upon the head 26 and the outer ends of the sections 12 and 13 are seated upon the flange 28 at the inner end of the cap.

The closing of the cap upon the shaft 10 depresses the disk 15 against the spring 16 holding the sections 12, 13, and 14 in position until the cap 23 is removed.

The free end 29 of the tip 25 is provided with perforations 30 through which the fish line 31 may be extended. When the invention is employed as a cane as illustrated in Fig. 2 of the drawing, the cap 23 may be grasped and unscrewed from the end of the shaft 10 and the sections 12, 13, and 14 permitted to pass outwardly of the shaft 10 by reason of their own weight, the said sections being then rotated for threaded engagement with each other. In a similar manner, the rod 20 will be shifted in the inner section 14 and the inner end 21 of the rod 20 engaged with the threads 22 of the outer sections, while the cap 23 being then removed,—provides a fish pole ready for use as illustrated in Fig. 1 of the drawings. The manner of folding the pole into cane formation will be understood from the foregoing description, it being seen that the cane is readily serviceable for use without indicating its inclusion of a fish pole construction.

What I claim as new is:—

1. A device of the class described comprising a tubular shaft, a handle at one end thereof, telescoping sections adapted for threaded engagement with each other and with said shaft when the sections are projected, a rod within the central section adapted for threaded engagement with the outer end thereof when the rod is projected, a resiliently mounted disk within the inner end of the shaft with said sections and rod seated thereon when in cane formation, a cap threaded upon the outer end of said rod and into the outer end of the shaft when the device is folded with the outer ends of said sections seated upon said cap.

2. A device of the class described comprising a tubular shaft, a handle at one end thereof, telescoping sections adapted for threaded engagement with each other and with said shaft when the sections are projected, a rod within the central section adapted for threaded engagement with the outer end thereof when the rod is projected, a head upon the outer end of the rod with a line supporting tip extending from the head, a cap threaded within the outer end of the shaft with the two outer sections seated upon the inner end of the cap when the device is closed, the cap having a central bore adapted for the reception of said tip and the threaded reception of said head when the device is closed with the outer end of the inner section seated upon said head.

3. A device of the class described comprising a tubular shaft, a handle projecting from the inner end of the shaft, a disk adjacent the inner end of the shaft, a spring support between said disk and the adjacent end of said handle, a rod and telescoping sections adapted for threaded engagement with each other positioned within the shaft and seated upon said disk with the spring compressed when the device is employed as a cane and a retaining cap for said rod and sections threaded into the free open end of the shaft and upon the outer end of said rod.

In testimony whereof I affix my signature.

STEPHEN SLIWINSKI.